Jan. 2, 1940.　　　W. C. McCOY　　　2,185,986
CLUTCH
Filed Dec. 7, 1937　　　2 Sheets-Sheet 1
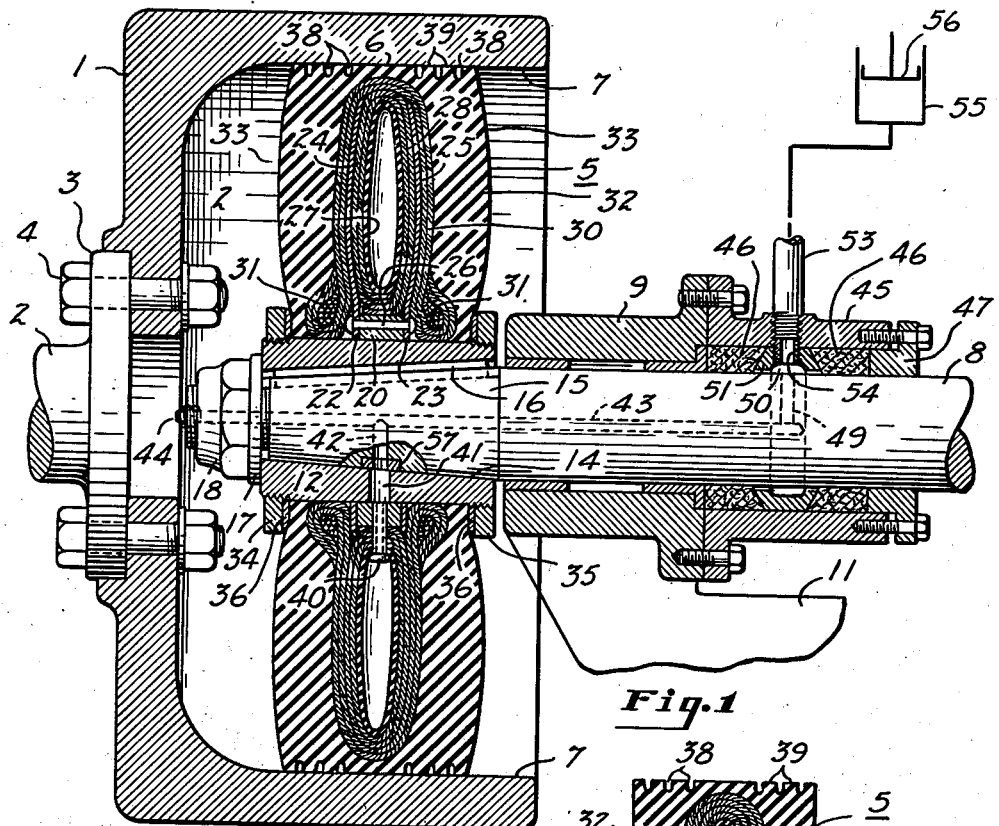
Fig.1
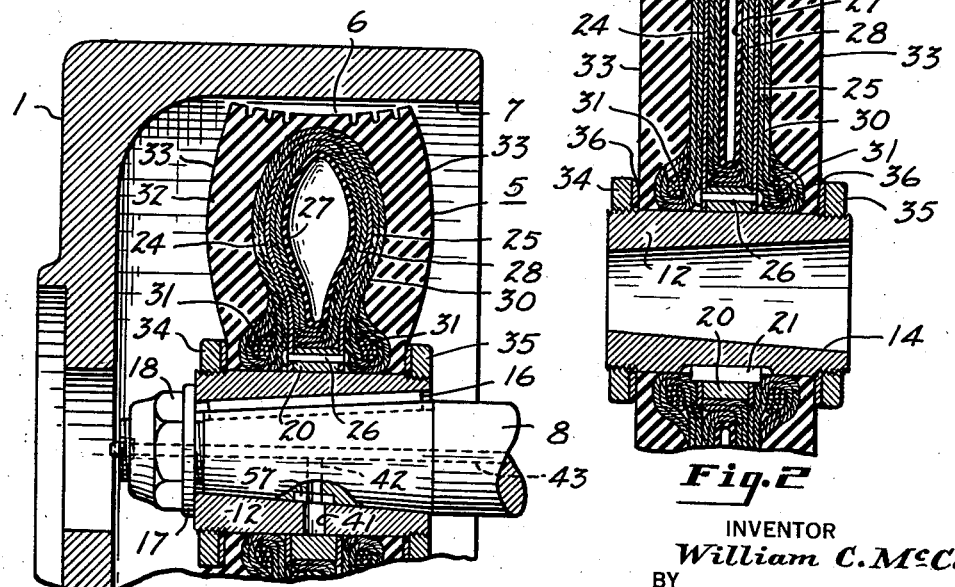
Fig.3
Fig.2
INVENTOR
William C. McCoy
BY
Evans & McCoy
ATTORNEYS Jan. 2, 1940.                W. C. McCOY                2,185,986
                               CLUTCH
                        Filed Dec. 7, 1937            2 Sheets-Sheet 2

INVENTOR
William C. McCoy
BY
Evans + McCoy
ATTORNEYS

Patented Jan. 2, 1940

2,185,986

UNITED STATES PATENT OFFICE 2,185,986

CLUTCH

William C. McCoy, Shaker Heights, Ohio, assignor to The General Tire & Rubber Company, Akron, Ohio, a corporation of Ohio Application December 7, 1937, Serial No. 178,553

19 Claims. (Cl. 192—88)

This invention relates to drive mechanisms and more particularly to a drive of flexible construction for transmitting torque and for providing a driving connection between rotatable driving and driven members and the like.

An object is to provide a drive of this character which is normally self-sufficient to retain the driving connection and is not dependent upon the sustained application of an auxiliary force.

Another object is to provide a friction type clutch which does not require accurate alignment of the driving and driven members and which is arranged to maintain an effective driving connection when subjected to axial thrust forces and when there is temporary axial misalignment of the drive and driven members during operation.

Another object is to provide a drive of this character embodying a yieldable deformable and elastic slip-resistant torque transmitting body which is sufficiently resilient to normally maintain a strong friction grip between the driving and driven members.

Another object is to provide a clutch construction in which the frictional engagement between driving and driven members is normally maintained by the inherent resiliency and elasticity of a deformable body and the driving connection between the members is broken by applying a deforming force to the deformable body.

A further object is to provide a friction clutch or drive which is simple in design and construction and inexpensive to manufacture. Other objects and advantages will appear from the following detailed description of the invention, made in connection with the accompanying drawings, in which:

Figure 1 is a sectional view with parts removed and parts broken away, taken longitudinally through a clutch construction embodying the invention;

Fig. 2 is a fragmentary detail view, in section, showing the construction of deformable elastic friction body in its molded form;

Fig. 3 is a fragmentary sectional view similar to Fig. 1 showing the deformable friction body distorted and the clutch disengaged;

Figure 4:
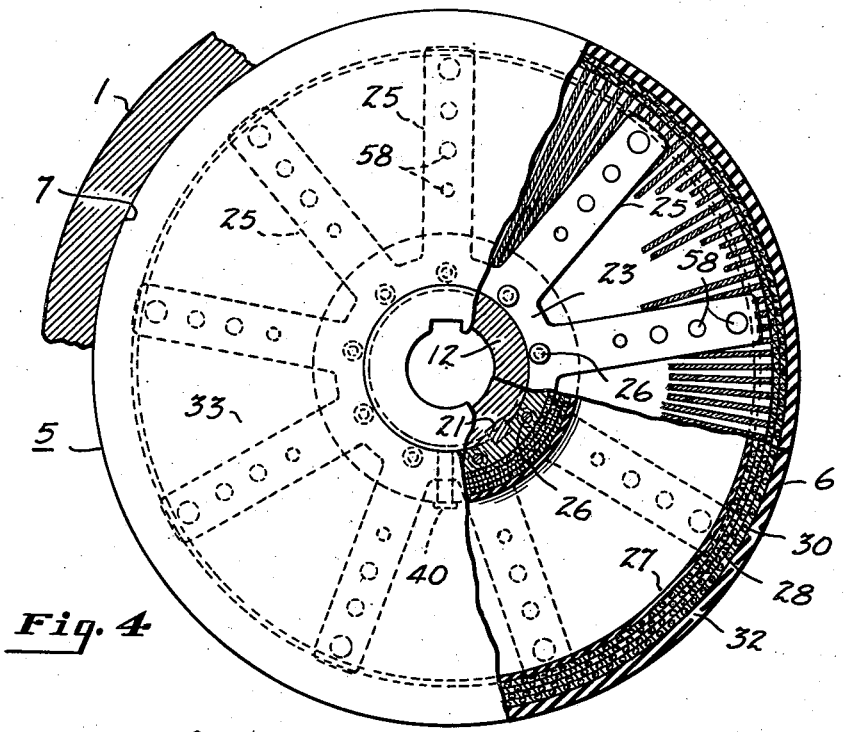
Fig. 4 is a view transversely through the axis of the clutch shown in Fig. 1 with parts removed and with parts broken away to show the construction of the friction body.

Referring to Figs. 1 through 4 by numerals of reference which have been applied to like parts throughout the drawings, the clutch comprises a cylindrical drum or drive member 1 carried by a drive shaft 2, being secured on an end flange 3 of the shaft 2 for rotation therewith by bolts 4. An elastic or deformable annulus 5 has a peripheral friction surface 6 which normally is in frictional engagement with an inwardly directed cylindrical friction surface 7 formed internally of the drum 1. The annulus 5 is secured on a driven shaft 8 rotatably carried in journal 9 and substantially in axial alignment with the drive shaft 2. Although in describing the invention the drum 1 and its related parts are referred to as the driving member or element and the deformable annulus 5 and its related parts are referred to as the driven member or element, it is apparent that the arrangement could be reversed so that the annulus 5 would function as a driving member and the drum 1 as a driven member.

A contemplated adaptation of the invention is in connection with the transmission of power from an engine in which the shaft 2 may be the crank shaft of the engine and the drum 1 may be formed of heavy metal such as iron or steel and serve as a flywheel for the engine. The journal 9 may be carried on any suitable bracket, indicated at 11, for supporting the shaft 8 in proper position with respect to the shaft 2. Other journals, not shown, for the shaft 8 may be provided in the usual manner, as required. A cylindrical sleeve or hub 12 carries the annulus 5 and has an axial taper bore 14 received on tapered end 15 of the shaft 8 and secured against rotation by key 16. The hub assembly is retained on the shaft 8 by washer 17 and nut 18.

A metal band or ring 20 extends circumferentially about the hub 12 at a central portion thereof and is secured against rotation relative to the hub by a key 21 (Fig. 2). A pair of spiders 22 and 23 are disposed about the hub 12 and have a plurality of radially directed legs 24 and 25, respectively. The central portions of the spiders 22 and 23 abut circumferentially against the ring 20 and are secured thereto by rivets 26. In the annular space between the legs of the spiders and extending about the hub 12 is disposed a rubber tube 27 reinforced by cord fabric material 28, the individual threads of which preferably extend radially with respect to the axis of the shaft 8. The spiders 22 and 23 and the reinforced inner tube 27 are enveloped by an outer layer of reinforcing fabric 30, the marginal edges of which enfold beads 31 extending circumferentially about the hub 12 and closely adjacent thereto.

An outer envelope or cover 32, preferably formed of rubber or similar deformable material having like properties of elasticity and inherent resiliency surrounds the spiders 22 and 23, inner tube 27, fabric reinforcements 28 and 30 and the beads 31. The raidially directed outer surface of the rubber envelope 32 forms the friction face 6 of the deformable annulus 5 and side walls 33 of the annulus are made relatively thick to resist deformation of the annulus upon pressure being applied to the friction surface 6 in a radial direction.

A pair of jamb rings 34 and 35, having threaded engagement with opposite ends of the hub 12, assist in retaining the annulus 5 on the hub and serve to compress the beads 31 toward one another and against the ring 20. Preferably washers 36 are disposed between the jamb rings 34 and 35 and the annulus 5 to facilitate the tightening of the ring against the annulus.

The annulus 5, when unconfined, is in the form illustrated in Fig. 2 and the diameter across the friction face 6 is slightly in excess of the internal diameter of the drum 1 so that when the annulus is disposed within the drum 1 the friction face 6 is circumferentially embraced by the internally directed surface 7 of the drum to establish a driving connection between the members. The radial pressure exerted on the annulus 5 by the drum 1 deforms the annulus into substantially the shape shown in Fig. 1. On account of the inherent resiliency of the annulus, assisted by the springlike legs 24 and 25 of the spiders, which likewise have been deformed by the radial pressure, the annulus tends to assume its normal or molded shape shown in Fig. 2 so that the friction face 6 is normally continuously urged radially outward against the embracing surface 7 of the drum 1. Thus the driving connection between the members is maintained without the application of any external force or pressure. Preferably a plurality of circumferentially extending grooves 38 are formed in the friction face 6 of the annulus to provide a multiplicity of annular, endless ribs 39 which increase the frictional engagement between the surface 7 of the drum 1 and the face 6 of the annulus.

When it is desired to disconnect the driven from the driving member the friction face 6 of the annulus 5 is released from engagement with the friction surface 7 of the drum 1. This is accomplished by applying an internal fluid pressure within the inner tube 27 which distends the side walls 33 of the annulus and radially contracts the friction face 6 away from the surface 7, as shown in Fig. 3. Fluid is introduced into and removed from the chamber in the tube 27 through a radially disposed tube 40 which extends through the fabric material 28 and ring 20. The bore in the tube 40 is aligned with a radial passage 41 through the hub 12 which communicates with a radial passage 42 in the tapered end 15 of the shaft 8. The fluid flows longitudinally through the shaft 8 in an axial bore 43 in communication with the passage 42 and sealed at its outer end by a plug 44.

A sleeve 45 is secured by an annular flange to the journal 9 and is concentric with the shaft 8. The internal diameter of the sleeve 45 is greater than the diameter of the shaft 8 to provide an annular stuffing box between the sleeve and shaft which is filled with suitable packing material 46 compressed by a gland or follower 47. A radial passage 49 formed in the shaft 8 communicates with the axial bore 43 and a trundle groove 50 formed in the internal face of a lantern ring 51 disposed in the stuffing box and embraced by the packing 46. A fluid supply pipe 53 is threaded into a passage in the flanged sleeve 45 and communicates with the trundle groove 50 in the ring 51 through a radial passage in the latter which is maintained in alignment with the passage in the sleeve 45 by means of a nipple 54 which is carried partly in the ring 51 and partly in the sleeve 45.

The fluid supply pipe 53 is connected to any suitable means for supplying fluid under pressure or withdrawing the fluid in a reverse direction from the chamber in the inner tube 27. In Fig. 1 such a means is diagrammatically represented by the cylinder 55 in which a piston 56 is reciprocably mounted. The fluid employed may be either a liquid such as oil or water or a gas such as air. Escape of the fluid between the shaft 8 and lantern ring 51 is prevented by the packing material 46 compressed by the gland 47.

A rubber washer 57 disposed in a recess surrounding the passage 42 in the tapered portion of the shaft 8 prevents leakage of the fluid between the shaft and hub 12. The passage 41 in the hub 12 is maintained in communication with the passage 42 in the shaft 8 by a key 16 which prevents rotational movement of the hub with respect to the shaft. Similarly key 21, Fig. 2, prevents rotational movement of the ring 20 with respect to the hub 12 and keeps the fluid tube 40 in the ring 20 in communication with the passage 41 in the hub 12.

The driven member comprising the annulus 5 and hub 12 may be advantageously assembled as a unit. The ring 20 is positioned on the hub 12 with the fluid tube 40 secured therein and in alignment with the passage 41 and the key 21 in place in the keyways formed in the ring and hub. The rubber tube 27 previously prepared with its reinforcing envelope 28 is then placed about the hub on the ring 20 and the tube 40 positioned in an aperture formed through the inner tube and fabric so as to communicate with the fluid cavity within the tube. Spiders 22 and 23 are secured to the ring 20 on opposite sides of the inner tube 27 and the outer reinforcing fabric envelope 30 applied. The beads 31, previously formed, are slipped over the opposite ends of the hub 12 and the inner marginal edges of the fabric 30 folded thereover. The raw rubber compound to form the envelope 32 is then disposed about the reinforcing cords 30 and in circumferential contact with the hub 12 adjacent the beads 31. The washers 36 and jamb rings 34 and 35 are then applied and tightened after which the assembly is placed in a suitable mold and vulcanized, the mold being provided with means for forming the grooves 38 and ribs 39. After removal from the mold the jamb rings 34 and 35 may be given a final tightening and the unit secured on the shaft 8 as previously described.

In its normal or molded form the annulus or driven member is substantially collapsed as shown in Fig. 2, and the cavity within the inner tube 27 is of minimum volume. The spiders 22 and 23 are substantially straight and flat. During vulcanization the legs 24 and 25 of the spiders become firmly embedded between the fabric layers 28 and 30, these layers becoming bonded together between adjacent legs of each of the spiders so that rotary movement of the deformable portion of the annulus with respect to the spider and hub is prevented. Accordingly, the spiders 22 and 23 which are keyed onto the hub 12 by means of the ring 20 are effective to carry the torque load and relieve the deformable portion of the annulus of twisting strains. If desired, a multiplicity of apertures 58 may be formed in the legs 24 and 25 of the spider as shown in Fig. 4. These apertures permit the fabric layers 28 and 30 to bond together at these points to further strengthen the construction.

As previously mentioned, the outside diameter of the friction face 6 of the driven member is slightly greater than the internal diameter of the friction surface 7 of the drum 1. Accordingly, to contract the circumference of the annulus 5 so that it may be disposed within the drum 1, a fluid pressure is applied internally of the annulus by means of the cylinder 55 and piston 56 which force fluid through supply pipe 53 into the trundle groove 50, through radial passage 49, axial passage 43, and radial passage 42 in the shaft 8, thence through passageway 41 in the hub 12 and into the rubber tube 27 through the fluid tube 40. When the annulus is within the drum 1 the fluid pressure may be relieved so that the annulus tends to assume its molded shape. However, the friction face 6 of the annulus 5 is normally circumferentially engaged by the surface 7 of the drum before the side walls 33 fully recover their molded shape so that their inherent resiliency tends to maintain the frictional engagement between the surface 6 of the annulus and surface 7 of the drum. The legs 24 and 25 of the spiders are also slightly deformed and assist in thrusting the frictional surface of the annulus radially outward against the confined surface of the drum.

To release the driving connection between the members of the clutch an internal fluid pressure is applied within the hollow annulus by means of the piston 56 working in the cylinder 55 so that the rubber tube 27 tends to assume a rounded or thickened shape as shown in Fig. 3 in order to provide an increased volume to accommodate the fluid forced therein. The cords of the reinforcing fabric 28 and 30, disposed about the tube 27 in a radial direction with respect to the axis of the shaft 8, resist circumferential expansion of the annulus 5 so that the outward or axial swelling of the annulus resulting from the increase in volume of the tube 27, causes a drawing-in of the peripheral friction surface 6 so that the latter is released from frictional engagement with the cylindrical surface 7 of the drum 1 and the driving connection between the members is released.

Figures 5, 6:
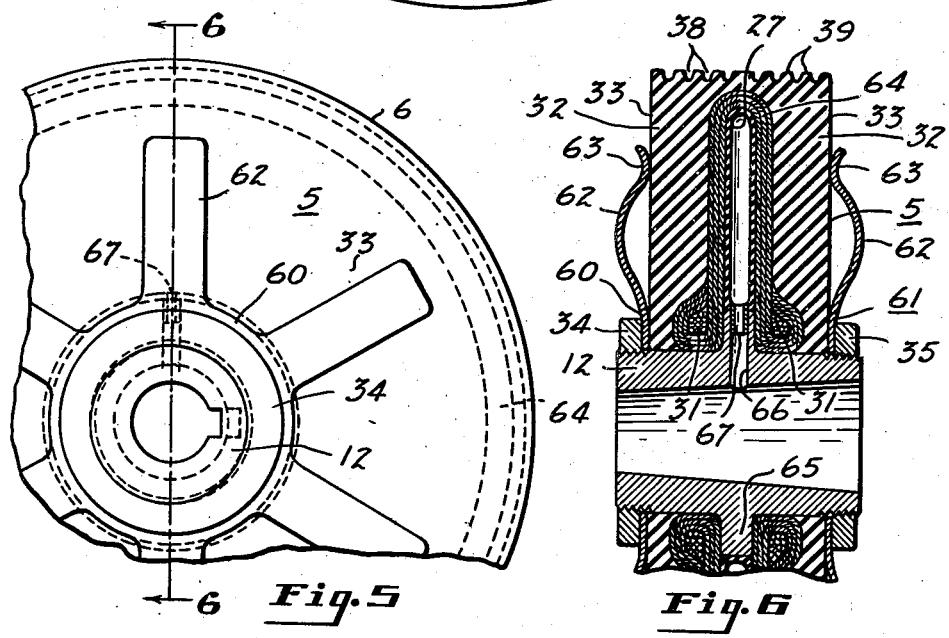
Fig. 5 is a fragmentary view similar to Fig. 4 showing a modified construction of a clutch embodying the invention.
Fig. 6 is a sectional view taken substantially on the line 6—6 of Fig. 5.

In Figs. 5 and 6 is illustrated a modification of the invention in which annular spiders 60 and 61 are carried by the hub 12 on opposite sides of the annulus 5. These spiders replace the washers 36 and are secured on the hub and pressed against the annulus by the jamb rings 34 and 35. Legs 62 of the spider are bowed in an axial direction and have outwardly curved ends 63 directed away from the annulus. The legs 62 embrace the opposite side walls 33 of the annulus at points intermediate the hub 12 and the annular friction face 6. The rubber inner tube 27 is reinforced by fabric 64 having cords radially disposed with respect to the axis of the hub 12 and the beads 31 are enclosed in the inner marginal portions of the fabric which reinforces the inner tube.

An annular flange or collar 65 is formed about the hub 12 at a central portion thereof and is drilled at 66 and provided with a nipple 67 so as to afford a passage for the actuating fluid. The bore 66 is aligned with the passageway 42 in the shaft 8 in the same manner as the passageway 41 previously described in connection with the preceding figures.

Rotational movement of the annulus 5, shown in Fig. 6, with respect to the hub 12 is resisted by the vulcanized bond between the two parts supplemented by the embracing action of the jamb rings 34 and 35 which serve to force the spiders 60 and 61 against the side walls 33 of the annulus. In addition, the beads 31 embrace the flange 65 and are secured in position by the jamb rings and spiders.

A clutch construction embodying the present invention has numerous advantages which render it useful in the drive mechanism for many machines. The flexible and elastic annulus permits slight misalignment of the drive and driven shafts and also slight longitudinal movement of one with respect to the other while maintaining an effective drive connection. The inherent resiliency and elasticity of the deformable annulus serves to maintain the frictional engagement between the parts without the use of any supplemental pressure so that the operation or functioning of the clutch is not dependent upon another mechanism except when it is desired to disengage the clutch. Since in most mechanical constructions the period of disengagement of a clutch is much shorter than the period of engagement, the present invention affords a pneumatically operated clutch which requires the application of a pneumatic pressure for a minimum period of time.

Other modes of utilizing the principles of the present invention may be adopted, change being made in the construction and assembly of the various parts as desired, it being understood that the embodiments shown in the drawings and set forth above are given for purposes of explanation and illustration, various modifications of the apparatus and procedure being contemplated.

What I claim is:

1. A driving connection comprising a pair of rotatable members, a hollow flexible annulus between the members, said annulus being secured to one of the members and formed to normally maintain frictional engagement with the other member through inherent elasticity, means for applying a fluid pressure internally of the annulus, and the annulus arranged to be deformed by said pressure and disengaged from the member with which it is normally frictionally engaged.

2. A driving connection comprising an outer member and an inner member within the outer member, a hollow flexible annulus between the members, said annulus being secured to one of the members and formed to normally maintain frictional engagement with the other member through inherent elasticity, means for applying a fluid pressure internally of the annulus, and the annulus arranged to be deformed by said pressure and disengaged from the member with which it is normally frictionally engaged.

3. A driving connection comprising a rotatable drum having an inwardly directed cylindrical friction surface, a rotatable hub disposed within the drum, an elastic and deformable annulus secured on the hub and arranged to normally maintain frictional engagement with the friction surface through inherent resiliency, and means for deforming the annulus to release the frictional engagement.

4. A driving connection comprising a rotatable drum having an inwardly directed cylindrical friction surface, a rotatable hub disposed within the drum, a hollow rubber annulus secured on the hub and formed to normally maintain frictional engagement with the friction surface by means of its inherent resiliency, and means for applying a fluid pressure internally of the annulus to deform the same out of said frictional engagement.

5. A driving connection comprising a rotatable drum having an inwardly directed cylindrical friction surface, a rotatable hub disposed within the drum, a hollow rubber annulus secured on the hub and formed to normally maintain frictional engagement with the friction surface by means of its inherent resiliency, radially directed stiffening means associated with the rubber annulus to supplement the resiliency of the annulus and assist in maintaining the normal frictional engagement between the annulus and the cylindrical surface, and means for applying a fluid pressure internally of the annulus to deform the same out of said frictional engagement.

6. A driving connection comprising a rotatable member having an annular friction surface, a deformable and elastic, rotatable body having an annular friction surface, said member and body arranged so that the friction surfaces are normally held in driving engagement by the inherent elasticity of the deformable elastic body, a chamber within said body, and means for supplying a fluid under pressure to said chamber, the body being arranged to be deformed upon the application of said fluid pressure internally of the chamber to withdraw the friction surface of the deformable elastic body from driving engagement with the friction surface of said rotatable member.

7. A driving connection comprising a rotatable member having an annular friction surface, a deformable and elastic annulus rotatably mounted and having a friction surface normally in engagement with the friction surface of the rotatable member to establish a driving connection between the member and annulus, said friction surface of the annulus being urged against the friction surface of the rotatable member by the inherent elasticity of the annulus, means for deforming the annulus to withdraw the friction surface thereof from driving engagement with the friction surface of the rotatable member, and tension elements embedded in the annulus and extending radially with respect thereto for reinforcing the annulus against radial distension during deformation thereof.

8. A rotatable release member for a clutch comprising a rotatable hub, a deformable and elastic annulus mounted on the hub and secured thereto for rotation therewith, an outwardly directed peripheral friction surface on the annulus, a chamber formed in the annulus between the hub and the friction surface, said chamber being materially greater in radial dimension than in axial dimension and having substantially inextensible walls, whereby the introduction of a fluid under pressure into the chamber effects a shortening of the radial dimension of the chamber to draw the peripheral friction surface radially inward, and means through which fluid can be forced to flow into the chamber.

9. A rotatable release member for a clutch comprising a rotatable hub, a hollow annulus formed of resilient rubber composition mounted on the hub and secured thereto for rotation therewith, an outwardly directed peripheral friction surface on the annulus, a fluid receiving chamber in the annulus and extending around the hub between the hub and the peripheral friction surface, a multiplicity of substantially inextensible cords embedded in the annulus and extending substantially radially with respect to the rotational axis of the hub to reinforce the annulus against radial distension, the chamber being materially wider radially than axially and arranged so that the introduction of a fluid under pressure into the chamber effects a shortening of the radial dimension of the chamber and annulus to draw the peripheral friction surface radially inward, and means through which fluid under pressure can be introduced into the chamber.

10. A rotatable release member for a clutch comprising a rotatable hub, a deformable annulus secured on the hub for rotation therewith, said annulus having an outwardly directed peripheral friction surface and side walls extending substantially radially between substantially the hub and the friction surface, a chamber formed in the annulus between the hub and the friction surface, the annulus being arranged upon the introduction of a fluid under pressure into the chamber to bow the side walls outwardly and to draw the peripheral friction surface radially inward, means for introducing a fluid under pressure into the chamber, and stiffening members having resilient, springlike, radially extending elements associated with the side walls to reinforce the latter and resist radial movement of the peripheral friction surface.

11. A rotatable release member for a clutch comprising a rotatable hub, a hollow annulus formed of resilient rubber composition mounted on the hub and secured thereto for rotation therewith, an outwardly directed peripheral friction surface on the annulus, a fluid receiving chamber in the annulus and extending around the hub between the hub and the peripheral friction surface, a plurality of plies of cord fabric material lining the fluid receiving chamber and arranged so that the individual cords thereof are disposed radially with respect to the axis of rotation of the hub to resist radial distension of the annulus, the chamber being materially wider radially than axially and arranged so that the introduction of a fluid under pressure into the chamber effects a shortening of the radial dimension of the chamber and annulus to draw the peripheral friction surface radially inward, and means through which fluid under pressure can be introduced into the chamber.

12. A rotatable release member for a clutch comprising a rotatable hub, a hollow annulus formed of resilient rubber composition mounted on the hub and secured thereto for rotation therewith, an outwardly directed peripheral friction surface on the annulus, a fluid receiving chamber in the annulus and extending around the hub between the hub and the peripheral friction surface, a plurality of plies of cord fabric material lining the fluid receiving chamber and arranged so that the individual cords thereof are disposed radially with respect to the axis of rotation of the hub to resist radial distension of the annulus, the chamber being materially wider radially than axially and arranged so that the introduction of a fluid under pressure into the chamber effects a shortening of the radial dimension of the chamber and annulus to draw the peripheral friction surface radially inward, stiffening members having resilient, springlike, radially extending elements embedded in the annulus between the rubber thereof and the innermost ply of said fabric material to reinforce the side walls and resist radial movement of the peripheral friction surface, and means through which fluid under pressure can be introduced into the chamber.

13. A rotatable release member for a clutch comprising a rotatable hub, a deformable annulus secured on the hub for rotation therewith, said annulus having an outwardly directed peripheral friction surface and side walls extending substantially radially between substantially the hub and the friction surface, a chamber formed in the annulus between the hub and the friction surface, the annulus being arranged upon the introduction of a fluid under pressure into the chamber to bow the side walls outwardly and to draw the peripheral friction surface radially inward, means for introducing a fluid under pressure into the chamber, and stiffening members disposed about the hub and against the side walls of the annulus, said stiffening member having radially extending springlike elements overlying the side walls in contacting relation therewith and arranged to be deformed by an outward bowing of the side walls to thereby resist said bowing.

14. In a driving connection, a shaft, a hub secured on the shaft, a resilient annulus secured on the hub for rotation therewith, said annulus being formed of an elastic rubber composition and having radially extending side walls and a radially outwardly directed peripheral friction surface, said annulus being deformable to distend the side walls axially and to contract said friction surface radially inwardly from its normal diameter to a reduced diameter, and stiffening members associated with the annulus having radially extending springlike elements arranged to urge the side walls axially toward one another and the friction surface radially outward upon deformation of the annulus.

15. In a driving connection, a rotatable shaft, a hub secured on the shaft, a ring embracing the hub for rotation therewith, a resilient, deformable annulus formed of an elastic rubber composition mounted on the hub for rotation therewith, and having a substantially annular friction surface formed thereon, a pair of axially spaced, inner peripheral portions of the annulus being disposed on opposite sides of the ring, a stiffening member secured to the ring, and having radially extending springlike elements embedded in the annulus, and reaching substantially to the friction surface, to transmit torque loads between the hub and friction surface, and retaining means secured on said hub on the outside of the annulus to prevent axial movement of said inner peripheral portions of the annulus on the hub.

16. In a driving connection, a rotatable shaft, a hub secured on the shaft, a resilient, deformable annulus formed of an elastic rubber composition mounted on the hub for rotation therewith, and having a substantially annular friction surface formed thereon, a stiffening member secured to the hub and having radially extending springlike elements embedded in the annulus, and reaching substantially to the friction surface to transmit torque loads between the hub and the friction surface, and means resisting axial movement of the annulus on the hub.

17. In a driving connection, a rotatable member having a substantially annular friction surface, a rotatable shaft, a hub secured on the shaft, a hollow, flexible annulus secured on the shaft, and having a peripheral friction surface, said annulus arranged to normally maintain frictional engagement between said friction surfaces through inherent elasticity, and the annulus arranged to be deformed upon the application thereto of an internal pressure to disengage the friction surface of the annulus from the friction surface of the rotatable member, an axial bore in the shaft, and a fluid-conducting passage extending radially from said bore through the shaft and hub, and into the annulus, whereby a fluid introduced into said bore under pressure flows into the annulus to deform the latter and disengage the said friction surfaces.

18. A driving connection comprising a rotatable drum having a substantially cylindrical friction surface, a rotatable member carried in substantially concentric relation with respect to the friction surface of said drum, a deformable annulus secured to said rotatable member, and having a substantially cylindrical friction surface normally of different diameter than that of the friction surface on the drum, whereby the embracing of one friction surface by the other deforms the annulus, said annulus having a greater radial thickness than axial length and being formed of elastic rubber composition to resist deformation and effect, through inherent elasticity, a strong frictional grip between the friction surfaces upon the embracing of one by the other, and a stiffening member secured to the rotatable member and having radially extending torque-transmitting elements embedded in the annulus, said elements being relatively thin and flat and normally disposed flatwise approximately in the plane of rotation of the annulus, and the elements adapted to be bowed upon said deformation of the annulus whereby the stress in the bowed elements increases the frictional grip between the surfaces.

19. A driving connection comprising a rotatable drum having a substantially cylindrical friction surface, a rotatable member carried in substantially concentric relation with respect to the friction surface of said drum, a deformable annulus secured to said rotatable member, and having a substantially cylindrical friction surface normally of different diameter than that of the friction surface on the drum, whereby the embracing of one friction surface by the other deforms the annulus, said annulus being formed of elastic rubber composition to resist deformation and effect, through inherent elasticity, a strong frictional grip between the friction surfaces upon the embracing of one by the other, a fluid-receiving chamber formed in the annulus, means for introducing a fluid under pressure into said chamber, and the annulus arranged to be deformed by said internal fluid pressure a greater amount than occurs by the embracing of one friction surface by the other to thereby release the frictional engagement between the friction surfaces.

WILLIAM C. McCOY.